United States Patent [19]

Ogasawara et al.

[11] Patent Number: 4,677,257

[45] Date of Patent: Jun. 30, 1987

[54] TELEMATIC SYSTEM AND METHOD OF CONTROLLING THE SAME

[75] Inventors: Fumihiro Ogasawara; Noboru Sonehara, both of Kanagawa, Japan

[73] Assignees: Ricoh Co., Ltd.; Nippon Telegraph & Telephone Corporation, both of Tokyo, Japan

[21] Appl. No.: 781,915

[22] Filed: Sep. 30, 1985

[30] Foreign Application Priority Data

Oct. 4, 1984 [JP] Japan ............................... 59-207016
Oct. 4, 1984 [JP] Japan ............................... 59-207017

[51] Int. Cl.$^4$ ..................... H04L 17/02; H04L 17/16
[52] U.S. Cl. ....................................... 178/4; 178/17.5; 178/25

[58] Field of Search ............... 178/4, 2 R, 4.1 R, 17.5, 178/25, 4.1 B, 26 R

[56] References Cited

FOREIGN PATENT DOCUMENTS 1124685  8/1968  United Kingdom .................... 178/4

*Primary Examiner*—Stafford D. Schreyer
*Attorney, Agent, or Firm*—Cooper, Dunham, Griffin & Moran

[57] ABSTRACT

In a telematic system, a plurality of response timings for a page boundary command, a page end command and the like from a sending system are prepared. A proper timing is selected in accordance with the type of sending system or an instruction from the sending system.

11 Claims, 5 Drawing Figures

TELEMATIC SYSTEM AND METHOD OF CONTROLLING THE SAME

BACKGROUND OF THE INVENTION

I. Field of the Invention

The present invention relates to a method of controlling a telematic system which has a protocol for controlling a response timing of a receiver and which is exemplified by a G4 facsimile system or a teletex extensively studied by the CCITT (International Consultative Committee for Telephone and Telegraph).

II. Description of the Prior Art

Telematic services with conventional G1, G2 and G3 facsimile systems (to be referred to as FAX hereinafter) have reached a limitation. Extensive studies have been made by the CCITT or the like on telematic service terminals (e.g., a teletex, a G4FAX and a mixed mode terminal). Among these studies, a protocol scheme for achieving high-speed transmission with high image quality and heterocommunication, i.e., communication between different types of communication terminals has been considered and is being standardized.

In a conventional telematic system for performing high-speed transmission with high image quality, a bit rate is very high, so that an actual image transfer period and sequence control periods before and after image data transmission greatly influence efficiency of a total communication period.

In normal communication, buffering is required at predetermined time slots in order to match the bit rates for an I/O device and a transmission line.

In this case, an affirmative response is sent back from a receiving FAX to a sending end in response to a page boundary command (including Command Document End (CDE)) transmitted from the sending end when the receiving FAX completes recording of all information or discharge of recorded paper. Recording of the previous page by buffering requires a long period of time and a still longer time is required for completion of discharge of the recorded paper. When such a conventional system is used for a high-speed telematic system without modifications, a longer sequence control period following the image data transmission is required. As a result, a total communication period cannot be greatly shortened, and hence efficient transmission cannot be performed.

SUMMARY OF THE INVENTION

It is an object of the present invention to shorten a total communication time and hence improve communication efficiency in a telematic system capable of high-speed transmission.

In order to achieve the above object of the present invention, a plurality of response timings are prepared for a sending end command, e.g., a page boundary command and a page end command, and a proper response timing is selected in accordance with a type of the sending device or a command from the sensing end.

According to an aspect of of the present invention, there is provided a method of controlling a telematic system, characterized by comprising the steps of: preparing a plurality of response timings of a reception response signal for a command signal which represents a transfer boundary of transfer data from a sending telematic system; responding to the command signal from a system excluding a specific telematic system at a first timing among the plurality of response timings, the first timing being provided immediately after the command signal is received; and reponding to a command signal from the specific telematic system at a second timing so as to guarantee transmission reliability, the second timing being provided following the first timing. The second timing is exemplified by an end of demodulation of the received transfer data, an end of recording of transmission data in a write control unit, or an end of discharge of the recorded paper from the write control unit.

In order to perform the above method, there is provided a telematic system characterized by comprising: means for registering a specific telematic system as a system subjected to communication with high reliability in advance; means for discriminating whether or not the other end of a line comprises the specific telematic system; and means for storing a plurality of response timings for reception response signals to be sent back to a sending telematic system in response to command signals representing boundaries of transfer data from the sending telematic system and for selecting a proper one of the response timings in accordance with a discrimination result.

According to another aspect of the present invention, there is provided a method of controlling a telematic system, characterized by comprising the steps of: preparing a plurality of response timings of reception response signals to be sent back in response to command signals representing boundaries of transfer data from a sending telematic system; adding to a sequence control command from the sending telematic system a parameter designating each response timing for each command signal from the sending telematic system representing a corresponding boundary of the transfer data; and selecting a proper response timing of a receiving telematic system in accordance with the parameter.

In order to perform the method of controlling a telematic system, there is provided a telematic system characterized by comprising: means for discriminating a content of a control signal designating a response timing of a response signal sent back in response to a command signal representing a boundary of transfer data, the control signal being added to a sequence control command transmitted from a sending telematic system; and means for storing a plurality of response timings of response signals to be sent back to a command signal which represents a boundary of transfer data and which is sent from the sending telematic system, selecting a proper response timing in accordance with a discrimination result, and sending back a corresponding response signal. The command signal representing the boundary of the transfer data comprises, for example, a page boundary command signal in a facsimile system. The response timings comprise a first timing given immediately after the page boundary command signal is received and a second timing given immediately after recording paper is exhausted from a write control unit in the telematic system.

DETAILED DESCRIPTION OF THE PREFERRED EMBODIMENTS

Telematic services will be practiced through the following communication networks:
PSDN (Packet-Switched Public Data Network)
CSDN (Circuit-Switched Public Data Network)
PSTN (Public Switched Telephone Network)
ISDN (Integrated Services Digital Network)

Among these networks, the ISDN is most promising. In the domestic information service, an INS (Information Network System) substantially the same as the ISDN will be able to serve in the near future. The present invention is exemplified by a G4FAX.

Figure 1:
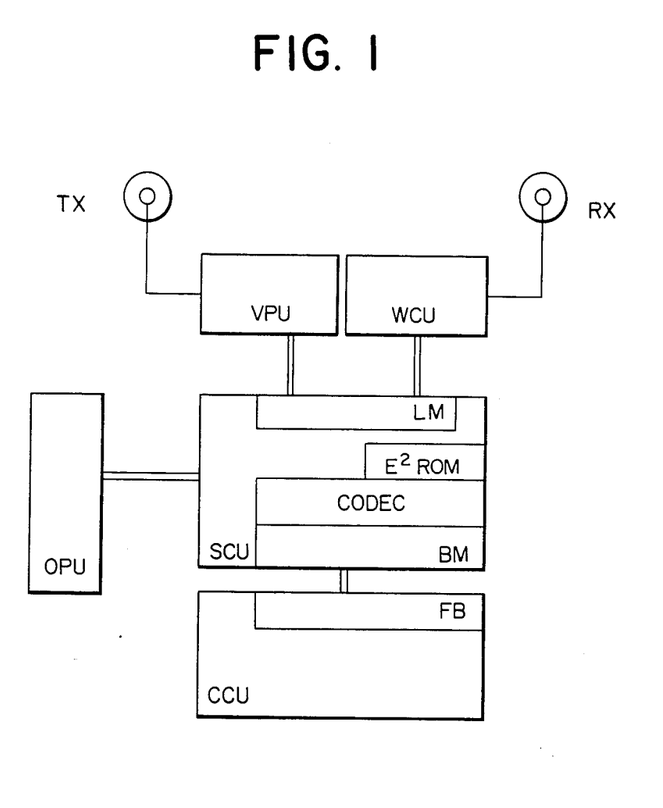
FIG. 1 is a block diagram showing a control circuit for performing a protocol when the telematic system is exemplified by a FAX.

FIG. 1 is a block diagram of a control circuit for exemplifying a protocol in the FAX.

In order to improve utilization efficiency of the communication network, buffer memories are arranged for the data transmitter and receiver to match the transmission line with the transmitter and receiver.

The FAX requires, a line memory LM, a buffer memory BM, a flow buffer memory FB and the like.

A system control unit SCU in FIG. 1 controls a communication control unit CCU, a video process unit VPU, a write control unit WCU and an operator interface unit OPU.

The system control unit SCU comprises a coder for compressing redundancy data from the image data received from the video process unit VPU to generate coded data, and a decoder for decoding the coded data to reproduce the original image data. The coder and the decoder are referred as a single unit as a CODEC hereinafter.

The communication control unit CCU performs a protocol for communicating with the other end of the like through a transmission line. The G4 protocol comprise a hierarchical protocol based on the OSI model in the ISO code system.

The G4FAX is suitable for the CSDN and INS (ISDN) networks. These networks have a high bit rate and are error-free systems in accordance with the HDLC (High Level Data Link Control Procedure). Therefore, unlike in the conventional G1, G2 and G3 telephone lines, high-speed transmission with high image quality can be achieved.

Figure 2A:
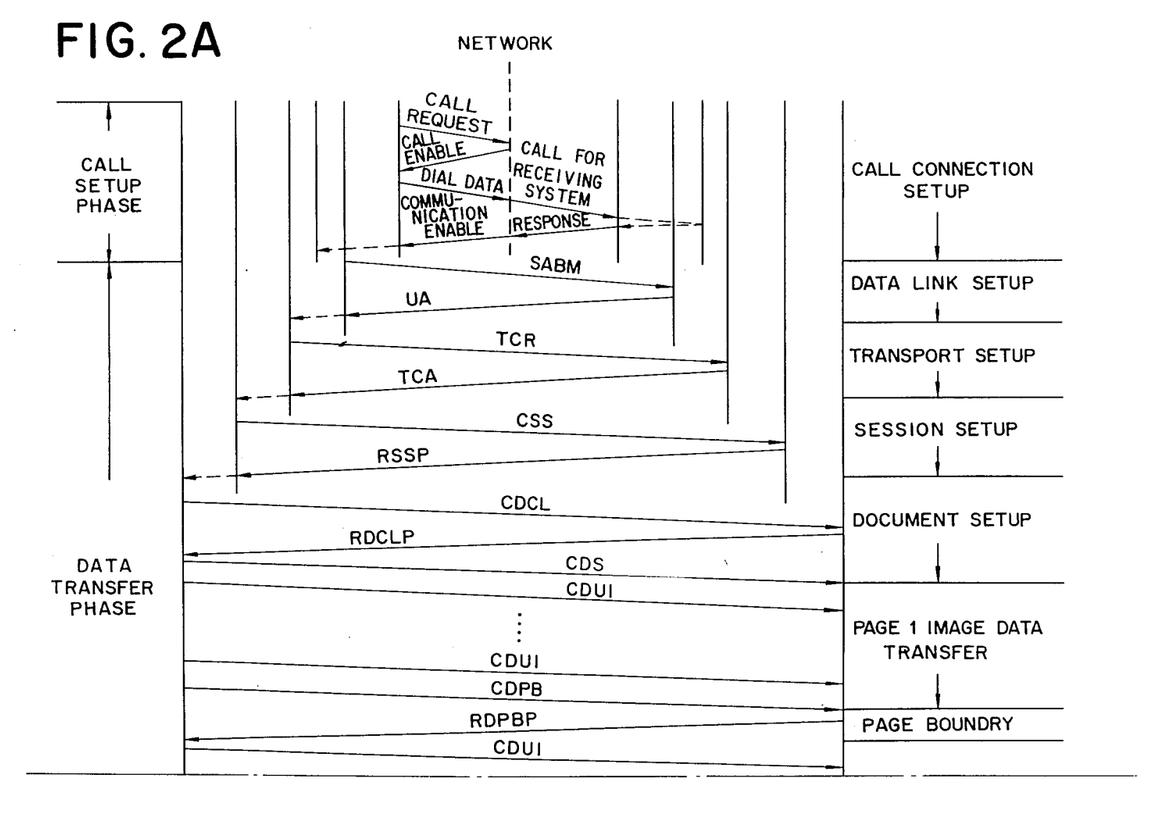
FIGS. 2a-2b are charts for explaining a protocol when a G4FAX is used in the telematic system according to the present invention.
Figure 2B:
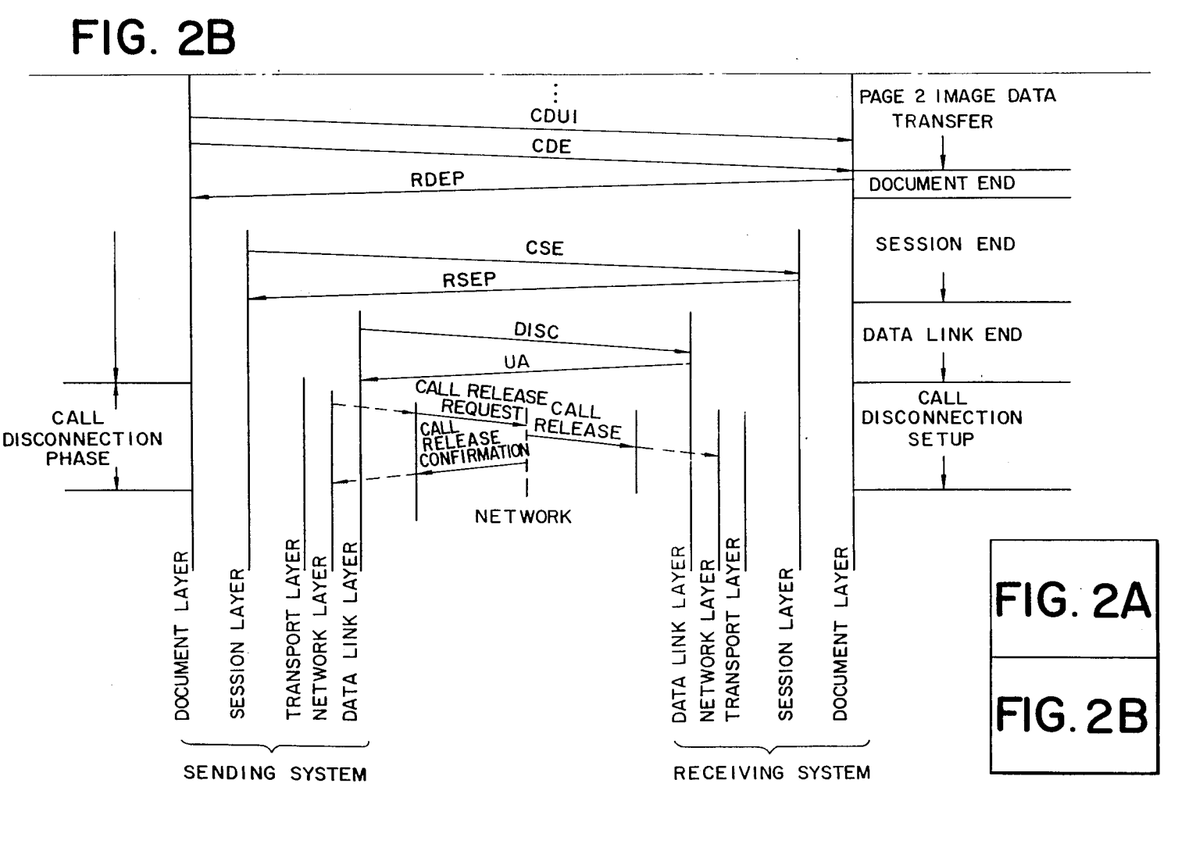

When the bit rate is high, an actual image data transfer period (FIG. 2) and sequence control periods before and after image data transmission greatly influence the efficiency of the total communication period.

In order to effectively transmit image data while the bit rate of the I/O device is matched with that of the transmission line, buffering must be performed in predetermined time slots, as shown in FIG. 1.

In a conventional system, an affirmative response is sent back from a receiving FAX to a sending end in response to a page boundary command (including CDE) transmitted from the sending end when the receiving FAX completes recording of all information or discharge of recorded paper. However, buffering requires a long period of time for recording of the previous page and a still longer time is required for completion of discharge of the recorded paper. When such a conventional system is used for a high-speed telematic system without modifications, a longer sequence control period following the image data transmission is required. As a result, a total communication period cannot be greatly shortened, and hence efficient transmission cannot be performed.

FIG. 2 shows a protocol of the G4FAX in the telematic system of the present invention. According to this protocol, two-page image data are successively transmitted in the following manner.

(i) Call Setup

A ringing signal is supplied to the incoming station through a public network provided by a carrier (Nippon Telegraph and Telephone Corporation: NTT in Japan) in accordance with a given procedure determined by one of the PSTN, PSDN, CSDN and ISDN (INS) networks.

(ii) Data Link Layer Setup

A data link layer uses the HDLC recommended by the CCITT. A data link layer connection is established by a SABM (Set ABM mode) and a UA (Un Numbered Accept).

(iii) Transport Layer Setup

A transport layer connection is established by a TCR (Transport Connection Request) and a TCA (Transport Connection Accept). In this case, the data block sizes of the sending and receiving systems are negotiated with each other to determine an octet (i.e., a byte number) used during communication.

(iv) Session Layer Setup

A session layer is established by a CSS (Command Session Start) and an RSSP (Response Session Start Positive). The ID and key codes of the sending and receiving systems are exchanged with each other, and their wind sizes are negotiated.

(v) Document Setup

A document layer connection is established by a CDCL (Command Document Capability List), an RDCLP (Response Document Capability List Positive) and a CDS (Command Document Start). The capabilities of the sending and receiving systems are acknowledged by the CDCL and RDCLP with each other. The CDS performs entry of an image data phase.

(vi) Image Data Transmission

Since the connection between the sending and receiving systems is established by procedures (i) to (v), a header is added to CDUI (Command Document User Information), and the image data is sent to a sublayer, and is sent out as the transmission image data onto the network (header processing is performed in each sublayer).

Transmission:

Image data from the video process unit VPU is supplied to a line memory LM and is coded by the CODEC. The coded data is stored in a buffer memory BM. The data is sent from the buffer memory BM to the communication control unit CCU and is stored in a flow buffer memory FB. The communication control unit CCU transfers the coded data to the document layer in the flow buffer memory FB and is subjected to heater processing. The header-processed coded data is sent onto the transmission line.

In the transmission mode, buffering between the read rate of the line memory LM and the buffer memory BM and the coding rate of the CODEC is performed. The buffer memory BM and the flow buffer memory FB buffer the CODEC coding rate and the bit rate.

Reception:

The header is removed in each layer in the communication control unit CCU from the data received from the transmission line. The resultant data is stored as the coded data in the flow buffer memory FB. The coded data is then transferred from the flow buffer memory FB to the buffer memory BM. The coded data is decoded by the CODEC. The decoded data is transferred to the line memory LM and is reproduced by the write control unit WCU.

In the reception mode, the flow buffer memory FB and the buffer memory BM buffer to match the bit rate of the transmission line with the CODEC decoding rate. (vii) Page Boundary and Document End When the next document is present at the end of first page transmission in procedure (vi), a page end is acknowledged to the receiving system by a command CDPB (Command Document Page Boundary). When the current page is the last page, a command CDE (Command Document End) is transmitted to the receiving system to acknowledge the end of document.

The receiving system sends back a response RDPBP (Response Document Page Boundary Positive) in response to the command CDPB. The receiving system also sends back a response RDEP (Response Document End Positive) in response to the command CDE. The page number parameter is added to the command/response, thereby page control and communication control of the wind size negotiated by session connection.

The above responses are positive responses. When the current page is not properly received, a negative response RDPBN (Response Document Page Boundary Negative) is used. The command CDE and the response RDEP designate an end of document layer connection. (viii) Session End The end of session connection is performed by a CSE (Command Session End) and an RSEP (Response Session End Positive). The end of transport layer simultaneously occurs as the end of session layer. (ix) The link layer connection is released by a DISC (Disconnect) and a UA (Unnumbered Accept).

(x) Call Disconnect Setup

The engagement is released at the end of one call. This procedure is determined in accordance with the type of network in the same manner as in procedure (i).

As described with reference to procedure (vii), the sending system sends the command CDPB to the receiving system at the page boundary (including the document end) and waits for the response RDPBP. In this case, when at least two wind sizes are to be negotiated and the nonchecked number of the already sent page is smaller than the wind size, the next page is transmitted.

The response timing for the command CDPB/CDE will be described hereinafter.

The faster the response for the CDPB/CDE is, the shorter the ineffective holding time of the line is. In other words, when the response for the command is fast, the communication time can be shortened. For a hard copy output in the FAX or the like, however, the end of normal discharge of the recording paper is the best response timing. As shown in FIG. 1, a large number of nondecoded and nonrecorded data are left by buffering by means of the line memory LM, the buffer memory BM and the flow buffer memory FB upon reception of the command CDPB/CDE. The paper discharge time is considerably long since mechanical control is required.

In order to shorten these ineffective times, condition (Wind Size)>1 is established, and the response timings are set at times upon reception of the commands CDPB and CDE.

(Wind Size)>1 is effective for continuous document feed but not for single document feed. The best way to shorten the communication time is to send back the response upon reception of the command CDPB/CDE.

When the response is sent back upon reception of the command, the flow buffer memory FB, the buffer memory BM and the line memory LM still store nonreproduced data. For this reason, after the affirmative response (RDPBP/RDEP) is sent back, the data is decoded and reproduced, and the recording sheet is discharged. Therefore, decoding errors, recording head overheat, recording paper jam or the like may occur.

A decoding error can be compensated by an error-free function by the HDLC sequence. A recording paper jam is substantially prevented by a simple mechanical system design and does not present a major problem.

According to the embodiment of the present invention, response timings are (a) command reception timing and (b) recording paper discharge timing. The normal response is sent at the timing (a), and a response to a specific system is sent at the timing (b).

The specific system is an FICS (Facsimile Intelligent Communication system) introduced by the NTT and a settable system (e.g., a center system). Data is transmitted to an absolutely reliable system and a response is always sent back therefrom.

The FICS is a system for providing various facsimile communication services to subscribers of the FICS network as part of the NTT network. For example, when a subscriber sends a simulcast request to the FICS, the FICS calls the called subscriber's systems for simulcast and simultaneously sends the calling subscriber's data to the called subscriber's systems. When the FICS receives the affirmative responses from the called subscriber's systems, it sends back a normal transfer acknowledge signal to the called subscriber's systems.

When the response is sent back at the timing (a), the normal transfer acknowledge signal is sent to the calling subscriber's system upon occurrence of paper jam even if proper reception is not performed. In order to solve this problem, a specific system is predetermined and is identified by the parameter in the protocol. The most reliable timing (b) is automatically selected, and the response is sent back at the timing (b). The responses which allow identification of the specific system can be an ID or a key code in the CSS or RSSP.

In the system of FIG. 1, the data of a telematic system subjected to high-reliability communication is prestored in the specific system register memory in the system control unit SCU. The specific system register memory preferably comprises a nonvolatile memory such as an $E^2PROM$ (Electrical Erasable Programable Read Only Memory) at which an operator can enter or update the specific system data at a keyboard in the operator interface unit OPU. Registration of a specific system is performed such that the operator enters an identification code, e.g., a key code or an identifier (ID) used in the communication protocol in the memory.

Figure 3:
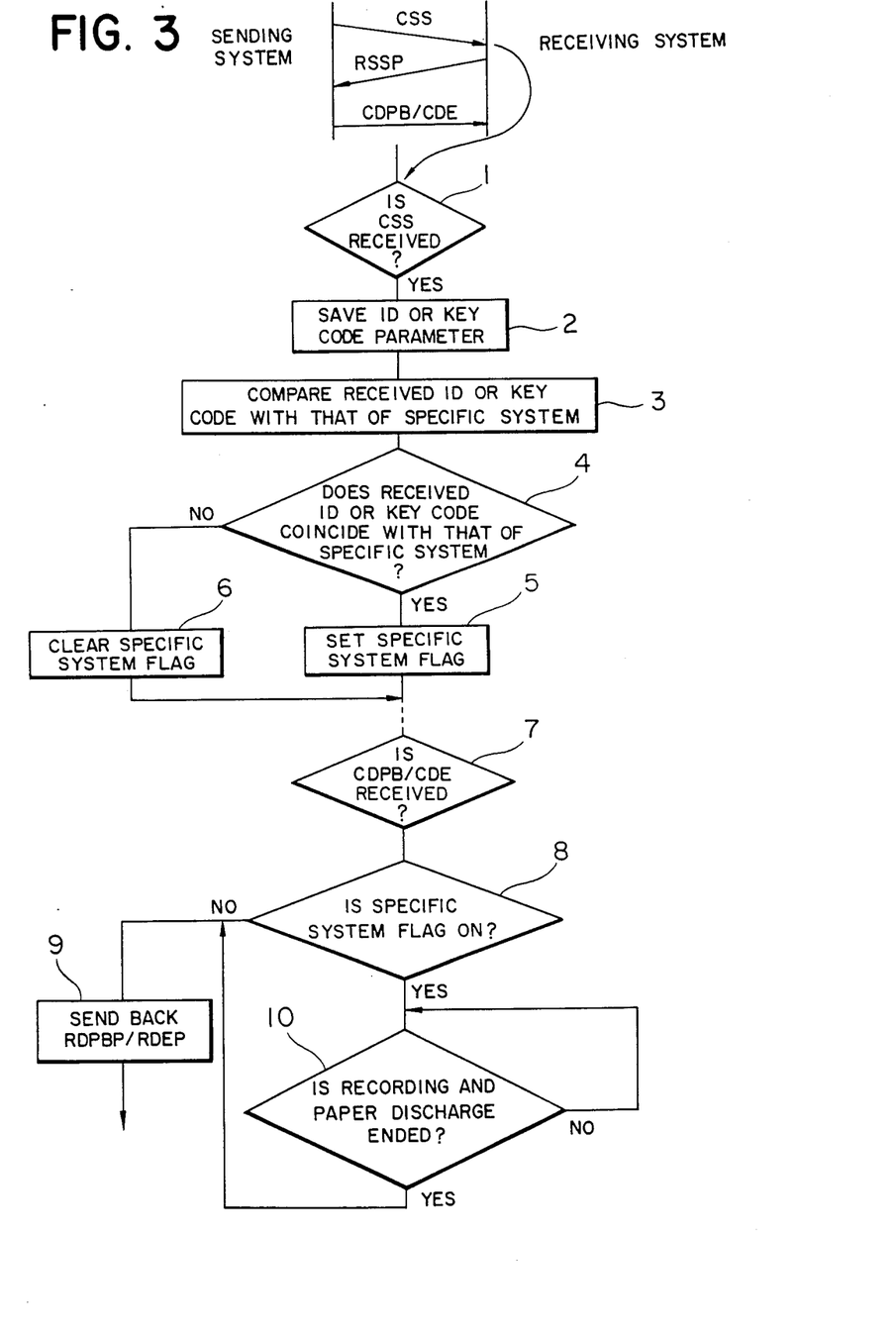
FIG. 3 is a flow chart showing a method of controlling the telematic system according to an embodiment of the present invention.

FIG. 3 is a flow chart showing steps of a method of controlling a telematic system according to an embodiment of the present invention. When the setting setup of the control signals CSS and RSSP is performed, a key code or ID included in the parameter of the CSS (or RSSP) signal is detected in step 1. The detected key cord or ID is saved or stored in step 2. The saved key code or ID is compared with the key code or ID of the specific system which are sequentially read out from the specific system register memory in step 3. When a coincidence between the received key code or ID and the readout key code or ID is established in step 4, a specific system flag is set in step 5. However, if NO in step 4, a specific system flag is reset in step 6. The CDPB or CDE reception is monitored in step 7. Upon reception of CDPB or CDE, whether or not the specific system flag is set is determined in step 8. If NO in step 8, the currently communicating system is determined not to be the specific system, and then the response RDPBP or RDEP is immediately sent back in step 9. However, if YES in step 8, the response RDPBP or RDEP is sent back in step 10 after recording or paper discharge is completed.

The above embodiment exemplifies the FAX. However, the above description can also be applied to a teletex since data must be transferred to a floppy disk although teletex communication is concentrated on memory-to-memory communication.

As may be apparent from the above description, the plurality of response timings are prepared at the receiving system. In normal operation, the timing for shortening the communication time is used. However, for the specific sending system or the station, the response is sent back at the most reliable response timing for the page command (including the document end). Therefore, the communication time can be shortened in normal transmission, but high-reliability communication can be performed for the system requiring high-reliability communication.

According to another embodiment of the present invention, the response timings are (a) a command reception timing (immediately after reception of the command) and (b) a recording paper discharge timing (immediately after recording paper discharge). In normal operation, the timing (a) is used to shorten the communication time. The timing (b) can be selected by the transmitting end to achieve high-reliability communication. Therefore, both high-speed communication and high-reliability communication can be accomplished.

The selection of the timing (a) and (b) can be acknowledged to the receiving system by the parameter added to the page boundary command from the transmitting system. For example, if a user wishes to send a confidential document, he depresses a corresponding switch to add a parameter corresponding to the response timing (b) to the page boundary command, and the resultant command is sent to the receiving system. The receiving system descrambles the command to send back the response at the timing (b).

Figure 4:
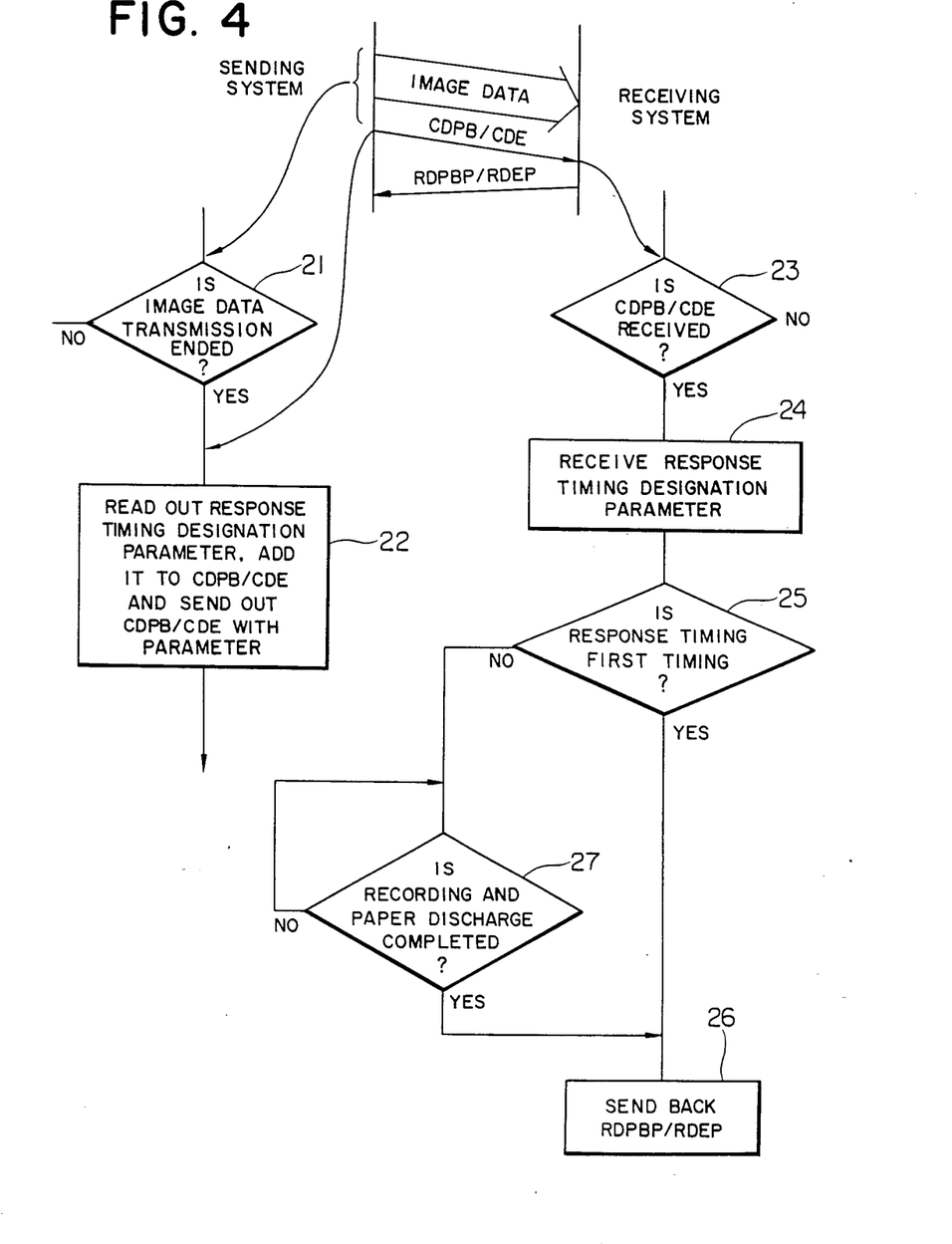
FIG. 4 is a flow chart showing a method of controlling the telematic system according to another embodiment of the present invention.

FIG. 4 is a flow chart for explaining the steps of a method of controlling a telematic system according to the embodiment described above. When a calling party wishes high-reliability communication and depresses the switch, the parameter representing the response timing is stored in the memory ($E^2$PROM or RAM) arranged in the SCR in the sending system. When image data is transmitted, the end of transmission is monitored in step 21. When the command CDPB or CDE is sent from the image data sending system, the memory is retrieved to add the response timing to the command, and the command with the parameter is sent to the receiving system in step 22. The receiving system monitors the command CDPB or CDE in step 23. Upon detection of the command, the parameter designating the response timing is set (saved) in a register (memory) and the contents of the register are checked in step 25. When the contents represent the timing (a), the response signal RDPBP or RDEP is sent back to the sending system in step 26. However, when the contents represent the timing (b), the response signal is sent back in step 26 after recording and paper discharge are completed.

In the above description, the response timing parameter is added to the page boundary command. However, another means may be used. For example, the operation may be performed by the session setup (FIG. 2).

What is claimed is:

1. A method of controlling a telematic system, comprising the steps of:
   preparing at a receiving system a plurality of response timings of a reception response signal for a command signal which represents a transfer boundary of transfer data from a sending telematic system;
   responding to a sending system to the command signal from a system excluding a specific telematic system at a first timing among the plurality of response timings, the first timing being providing immediately after the command signal is received;
   and responding to the sending system to a command signal from the specific telematic system at a second timing so as to guarantee transmission reliability, the second timing being provided following the first timing.

2. A method according to claim 1, wherein the command signal representing the boundary of the transfer data comprises a page boundary command signal for a facsimile system.

3. A method according to claim 1, wherein the second timing is a timing immediately after a recording sheet is discharged from a write control unit in the telematic system.

4. A method of controlling a telematic system, comprising the steps of:
   preparing at a receiving system a plurality of response timings of reception response signals to be sent back in response to command signals representing boundaries of transfer data from a sending telematic system;
   adding to a sequence control command from the sending telematic system a parameter designating each response timing for each command signal from the sending telematic system representing a corresponding boundary of the transfer data;
   and selecting a proper response timing of the receiving telematic system in accordance with the parameter for sending back to the sending system.

5. A method according to claim 4, wherein the command signal representing the boundary of the transfer data comprises a page boundary command signal for a facsimile system.

6. A method according to claim 4, wherein the sequence control command comprises a page boundary command signal for a facsimile system.

7. A method according to claim 5, wherein the response timings include a first timing given immediately after reception of the page boundary command signal and a second timing given immediately after paper discharge of a write control unit.

8. A telematic system comprising: means for registering a specific telematic system as a system subjected to communication with high reliability in advance; means for discriminating whether or not the other end of a line comprises the specific telematic system; and means for storing a plurality of response timings for reception response signals to be sent back to a sending telematic system in response to the command signals representing boundaries of transfer data from the sending telematic system and for selecting a proper one of the response timings in accordance with a discrimination result.

9. A system according to claim 8, wherein the command signal representing the boundary of transfer data comprises a page boundary command signal for a facsimile system, and the response timings include a first timing given immediately after reception of the page boundary command signal and a second timing given immediately after paper discharge of a write control unit.

10. A telematic system characterized by comprising:
means for discriminating a content of a control signal designating a response timing of a response signal sent by a receiving system back to a sending system in response to a command signal representing a boundary of transfer data, the control signal being added to a sequence control command transmitted from the sending telematic system;

and means for storing a plurality of response timings of response signals to be sent back in response to a command signal which represents a boundary of transfer data and which is sent from the sending telematic system, selecting a proper response timing in accordance with a discrimination result, and sending back a corresponding response signal from the receiving to the sending system.

11. A system according to claim 10, wherein the command signal representing the boundary of transfer data comprises a page boundary command signal for a facsimile system, and the response timings include a first timing given immediately after reception of the page boundary command signal and a second timing given immediately after paper discharge of a write control unit.

* * * * *